(12) United States Patent
Yamashita et al.

(10) Patent No.: US 12,411,287 B2
(45) Date of Patent: Sep. 9, 2025

(54) OPTICAL SIDE INPUT/OUTPUT CIRCUIT AND OPTICAL CONNECTOR

(71) Applicant: NIPPON TELEGRAPH AND TELEPHONE CORPORATION, Tokyo (JP)

(72) Inventors: Yoko Yamashita, Musashino (JP); Takashi Matsui, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 301 days.

(21) Appl. No.: 18/026,359

(22) PCT Filed: Sep. 18, 2020

(86) PCT No.: PCT/JP2020/035617
§ 371 (c)(1),
(2) Date: Mar. 15, 2023

(87) PCT Pub. No.: WO2022/059203
PCT Pub. Date: Mar. 24, 2022

(65) Prior Publication Data
US 2023/0400625 A1    Dec. 14, 2023

(51) Int. Cl.
*G02B 6/38* (2006.01)
*G02B 6/28* (2006.01)
*G02B 6/42* (2006.01)

(52) U.S. Cl.
CPC ......... *G02B 6/3807* (2013.01); *G02B 6/2852* (2013.01); *G02B 6/4287* (2013.01)

(58) Field of Classification Search
None
See application file for complete search history.

(56) References Cited

U.S. PATENT DOCUMENTS 6,535,671 B1 * 3/2003 Poole .................. G02B 6/2852
385/32
10,247,583 B2 * 4/2019 Schade ................ G01D 5/3538
(Continued)

FOREIGN PATENT DOCUMENTS

JP    2003-86875 A      3/2003
JP    2011-232706   *  11/2011
(Continued)

OTHER PUBLICATIONS

Peng Ji et al., Optics Express, vol. 26, No. 12, pp. 14972-14981, (2018).
(Continued)

*Primary Examiner* — Jerry Rahll
(74) *Attorney, Agent, or Firm* — Harness, Dickey & Pierce, P.L.C.

(57) ABSTRACT

An object is to provide an optical side input/output circuit that has wavelength selectivity and is easily disposed at multiple points in a transmission path, and an optical connector. An optical side input/output circuit according to the present invention includes: a grating portion in which a fiber Bragg grating that reflects light of a desired wavelength is formed in the core of an optical fiber, the light of the desired wavelength being of light propagating in the core; and a tap portion that is disposed at a stage before the grating portion in the propagation direction of the light, and is provided with a tap waveguide that outputs the light reflected by the grating portion from a side surface of the optical fiber.

4 Claims, 12 Drawing Sheets

(56) References Cited

U.S. PATENT DOCUMENTS

| | | | | |
|---|---|---|---|---|
| 2004/0033021 A1* | 2/2004 | Oguri | ............... | H04B 10/572 |
| | | | | 385/27 |
| 2007/0292078 A1* | 12/2007 | Iwama | ............... | G02B 6/4246 |
| | | | | 385/24 |
| 2008/0069497 A1* | 3/2008 | Tissot | ............... | G02B 6/29317 |
| | | | | 385/37 |
| 2010/0329602 A1* | 12/2010 | Shah | ............... | G01L 5/24 |
| | | | | 385/13 |
| 2015/0263477 A1 | 9/2015 | Onaka | | |
| 2015/0323752 A1* | 11/2015 | Gaber | ............... | G02B 6/3877 |
| | | | | 385/60 |
| 2017/0315317 A1* | 11/2017 | Jiang | ............... | H04B 10/075 |
| 2022/0043229 A1* | 2/2022 | Li | ............... | G02B 6/3845 |
| 2023/0400625 A1* | 12/2023 | Yamashita | ........... | G02B 6/124 |

FOREIGN PATENT DOCUMENTS

| | | |
|---|---|---|
| JP | 2011-232706 A | 11/2011 |
| JP | 2019-515346 A | 6/2019 |
| WO | WO-2014/091614 A1 | 6/2014 |

OTHER PUBLICATIONS

T. Erdogan, Journal of Lightwave Technology, vol. 15, No. 8, (1997).

* cited by examiner

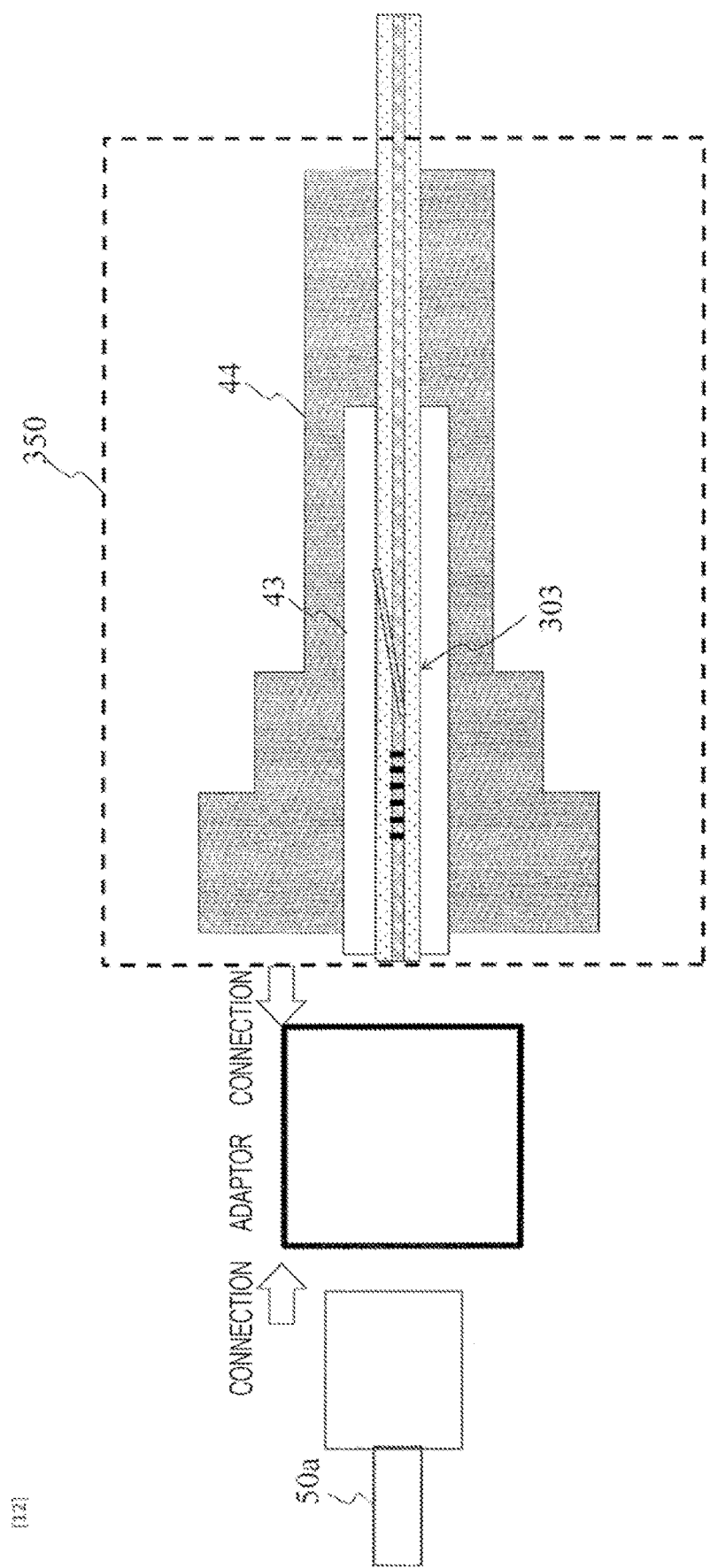

OPTICAL SIDE INPUT/OUTPUT CIRCUIT AND OPTICAL CONNECTOR

CROSS-REFERENCE TO RELATED APPLICATIONS

This application is a 371 U.S. National Phase of International Application No. PCT/JP2020/035617, filed on Sep. 18, 2020. The entire disclosure of the above application is incorporated herein by reference.

TECHNICAL FIELD

The present disclosure relates to an optical side input/output circuit that inputs/outputs light from a side surface of an optical fiber, and an optical connector including the optical side input/output circuit.

BACKGROUND ART

As an optical branching technique, a wavelength multiplexing coupler or the like using an arrayed waveguide grating is known. Also, to realize optical sensing and monitoring of a transmission path, an optical side output technique using a tap waveguide has been suggested. By the optical side output technique, an optical waveguide is formed by laser processing in a fiber, and part of the power of light is output from the core (see Non Patent Literature 1, for example).

CITATION LIST

Non Patent Literature

Non Patent Literature 1: Peng Ji et al, optics express, vol. 26, no. 12, p 14972-14981, (2018).
Non Patent Literature 2: T. Erdogan, Journal of Lightw. Technol., vol. 15, no. 8, (1997).

SUMMARY OF INVENTION

Technical Problem

A conventional wavelength multiplexing coupler is large in size, and has reflection and loss that are larger at connecting points. Therefore, it is difficult to dispose such wavelength multiplexing couplers at multiple points in a transmission path. Further, conventional tap waveguides are easily disposed at multiple points in a transmission path, but it is difficult to increase the wavelength selectivity of these tap waveguides.

Therefore, to solve the above problem, the present invention aims to provide an optical side input/output circuit that has wavelength selectivity and is easily disposed at multiple points in a transmission path, and an optical connector.

Solution to Problem

To achieve the above object, an optical side input/output circuit according to the present invention includes a tap waveguide having wavelength selectivity.

Specifically, an optical side input/output circuit according to the present invention includes:

a grating portion in which a fiber Bragg grating that reflects light of a desired wavelength is formed in the core of an optical fiber, the light of the desired wavelength being of light propagating in the core; and a tap portion that is disposed at a stage before the grating portion in the propagation direction of the light, and is provided with a tap waveguide that outputs a reflected light reflected by the grating portion from a side surface of the optical fiber.

Further, an optical connector according to the present invention includes the optical side input/output circuit.

The optical side input/output circuit has a fiber Bragg grating formed to give wavelength selectivity to the tap waveguide. Having the tap waveguide, the optical side input/output circuit is easily disposed at multiple points in a transmission path. Further, the optical side input/output circuit can input/output light of a desired wavelength with the fiber Bragg grating. Thus, the present invention can provide an optical side input/output circuit that has wavelength selectivity and is easily disposed at multiple points in a transmission path, and an optical connector.

The optical side input/output circuit according to the present invention is characterized in that a plurality of sets of the tap portion and the grating portion is continuously arranged in the optical fiber. Light of a desired wavelength can be supplied to the optical fiber.

The optical side input/output circuit according to the present invention further includes a light receiver that is disposed on the side surface of the optical fiber, and receives the reflected light output from the tap portion. Light of a desired wavelength can be received from the optical fiber.

Note that the respective inventions described above can be combined as appropriate.

Advantageous Effects of Invention

The present invention can provide an optical side input/output circuit that has wavelength selectivity and is easily disposed at multiple points in a transmission path, and an optical connector.

BRIEF DESCRIPTION OF DRAWINGS

FIG. 12 is a diagram for explaining an optical connector according to the present invention.

DESCRIPTION OF EMBODIMENTS

Embodiments of the present invention are described below with reference to the accompanying drawings. The embodiments described below are examples of the present invention, and the present invention is not limited to these embodiments. Note that components having the same reference signs in the present description and the drawings indicate the same components.

First Embodiment

Figure 1:
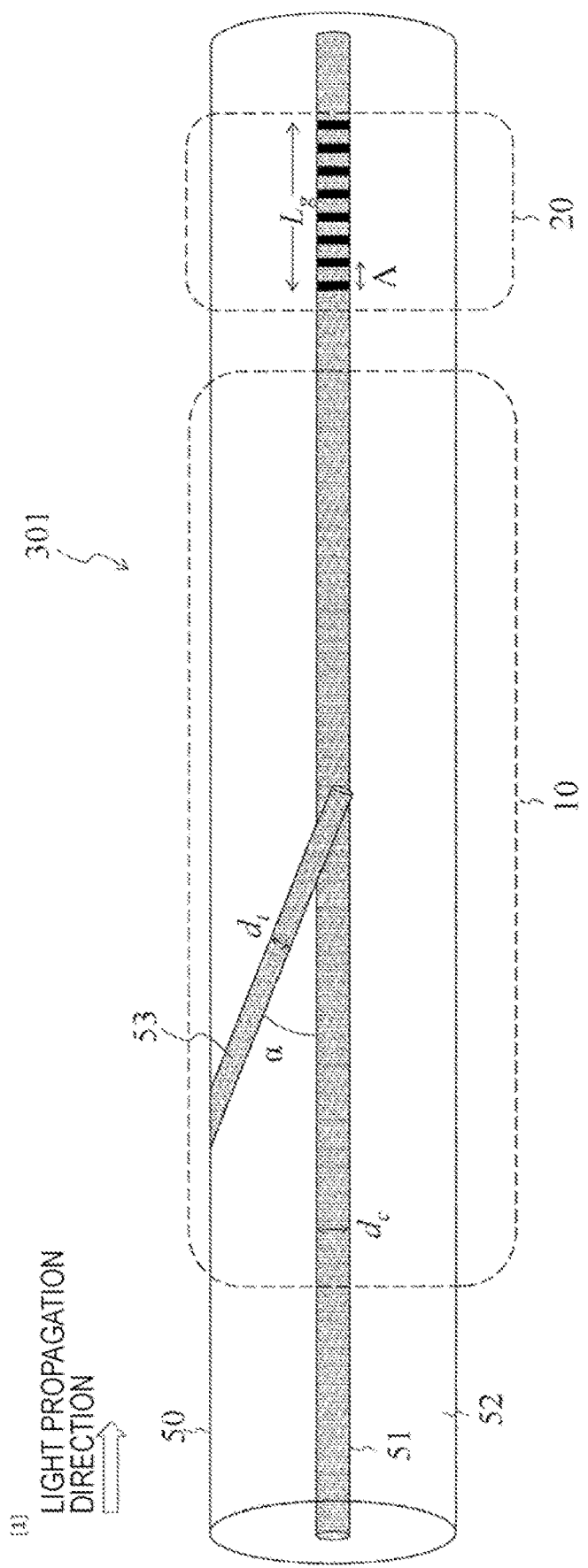
FIG. 1 is a diagram for explaining an optical side input/output circuit according to the present invention.

FIG. 1 is a diagram for explaining an optical side input/output circuit 301 according to this embodiment. The optical side input/output circuit 301 includes:
- a grating portion 20 in which a fiber Bragg grating 21 that reflects light of a desired wavelength is formed in the core 51 of an optical fiber 50, the light of the desired wavelength being of light propagating in the core 51; and
- a tap portion 10 that is disposed at a stage before the grating portion 20 in the propagation direction of the light, and is provided with a tap waveguide 53 that outputs the light reflected by the grating portion 20 from a side surface of the optical fiber 50.

The optical fiber 50 is a step-index fiber that is defined by the diameter $d_c$ of the core 51, the diameter df of the optical fiber 50, the refractive index $n_{core}$ of the core 51, and the refractive index $n_{clad}$ of a cladding 52. In the optical fiber 50, the tap portion 10 and the grating portion 20 are formed in this order in the longitudinal direction. The direction in which light entering from the tap waveguide 53 travels is the optical waveguide direction. In FIG. 1, the optical waveguide direction is the direction from left to right. Further, the direction in which the tap waveguide 53 faces the side surface of the optical fiber 50 from the core 51 is the tap direction. In FIG. 1, the tap direction is the direction inclined in the opposite direction to the optical waveguide direction.

The grating portion 20 reflects only the light of a desired wavelength in the light that has traveled in the optical waveguide direction and passed through the tap portion 10, and returns the reflected light to the tap portion 10. The coupling efficiency of light from the core 51 to the tap waveguide 53 in the tap portion 10 greatly depends on the light propagation direction. Specifically, light traveling in the optical waveguide direction in the core 51 is hardly coupled to the tap waveguide 53. On the other hand, light traveling in the direction opposite to the optical waveguide direction in the core 51 can be coupled to the tap waveguide 53, as appropriate α is set according to the mode coupling theory (see Non Patent Literature 1, for example). Here, α is an angle (on the acute angle side) formed by the tap waveguide 53 and the core 51.

The optical side input/output circuit 301 transmits light in the optical waveguide direction without being coupled to the tap waveguide 53 in the tap portion 10, reflects only a desired wavelength in the grating portion 20, returns the reflected light (light in the opposite direction to the optical waveguide direction) to the tap portion 10, and couples the reflected light to the tap waveguide 53.

The tap waveguide 53 and the grating 21 can be formed by locally modulating a refractive index of the optical fiber 50, using femtosecond laser processing, for example. Here, the amounts of refractive index modulation (differences from the refractive index before modulation) in the core and the cladding are denoted by $\delta n_{core}$ and $\delta n_{clad}$, respectively. That is, in the case of the core 51 (the overlapping portions of the grating 21, the core 51, and the tap waveguide 53), the refractive index after the modulation is expressed as $n_{core}+\delta n_{core}$. In the case of the cladding 52 (the tap waveguide 53 excluding the overlapping portions), the refractive index after the modulation is $n_{clad}+\delta n_{clad}$.

Figure 2:
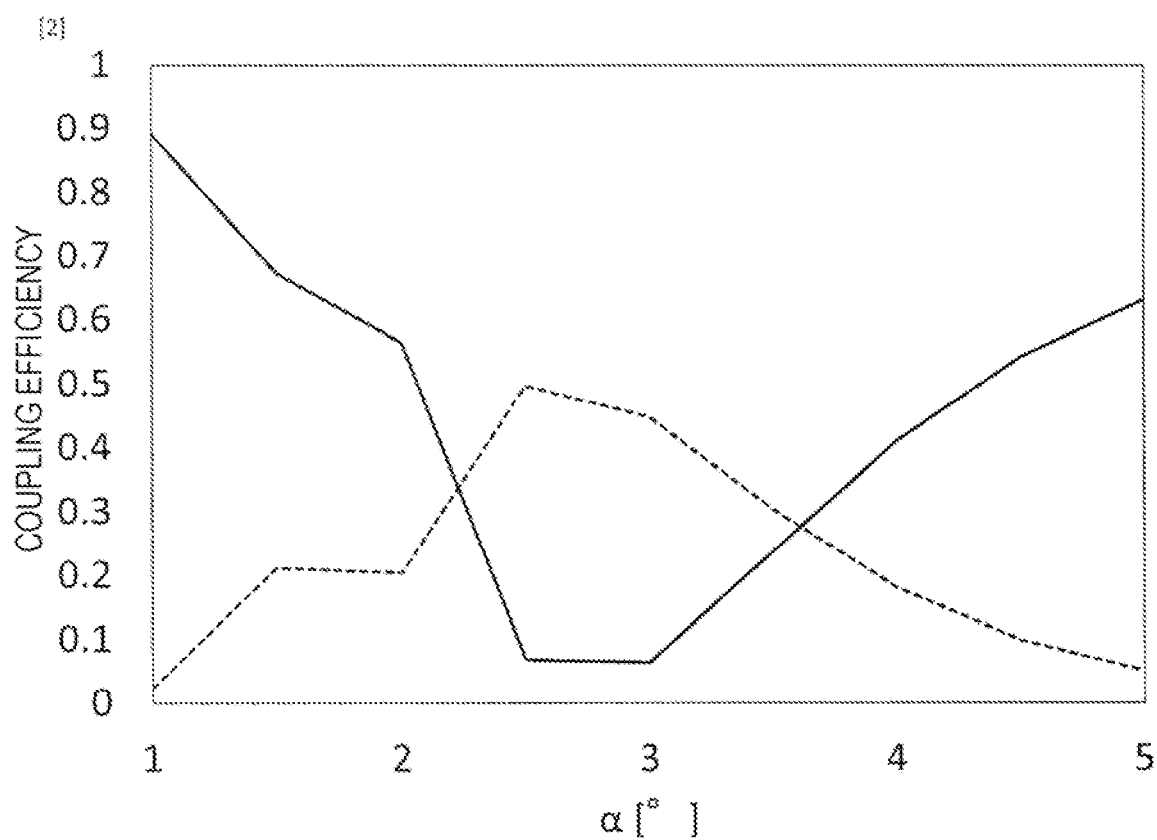
FIG. 2 is a graph for explaining the characteristics of an optical side input/output circuit according to the present invention.

FIG. 2 is a graph for explaining the α dependence of the coupling efficiency at which light propagating in the opposite direction to the light propagation direction in the core 51 is coupled to the tap waveguide 53. A tap waveguide 53 in which $\delta n_{core}=\delta n_{clad}=0.006$, and $d_t=6$ μm is formed for a fiber structure having a step-index refractive index distribution where $d_c=8.2$ μm, $n_{core}=1.449081$, and $n_{clad}=1.444$. The solid line indicates the efficiency of coupling to the core 51 (the ratio of light that is from the grating portion 20 and is propagating in the core 51), and the dotted line indicates the efficiency of coupling to the tap waveguide 53 (the ratio of light that is from the grating portion 20 and is coupled to the tap waveguide 53). As can be seen from the graph, the efficiency of coupling to the tap waveguide 53 changes with α, and the coupling efficiency is maximized when α=2.5°.

Figure 3:
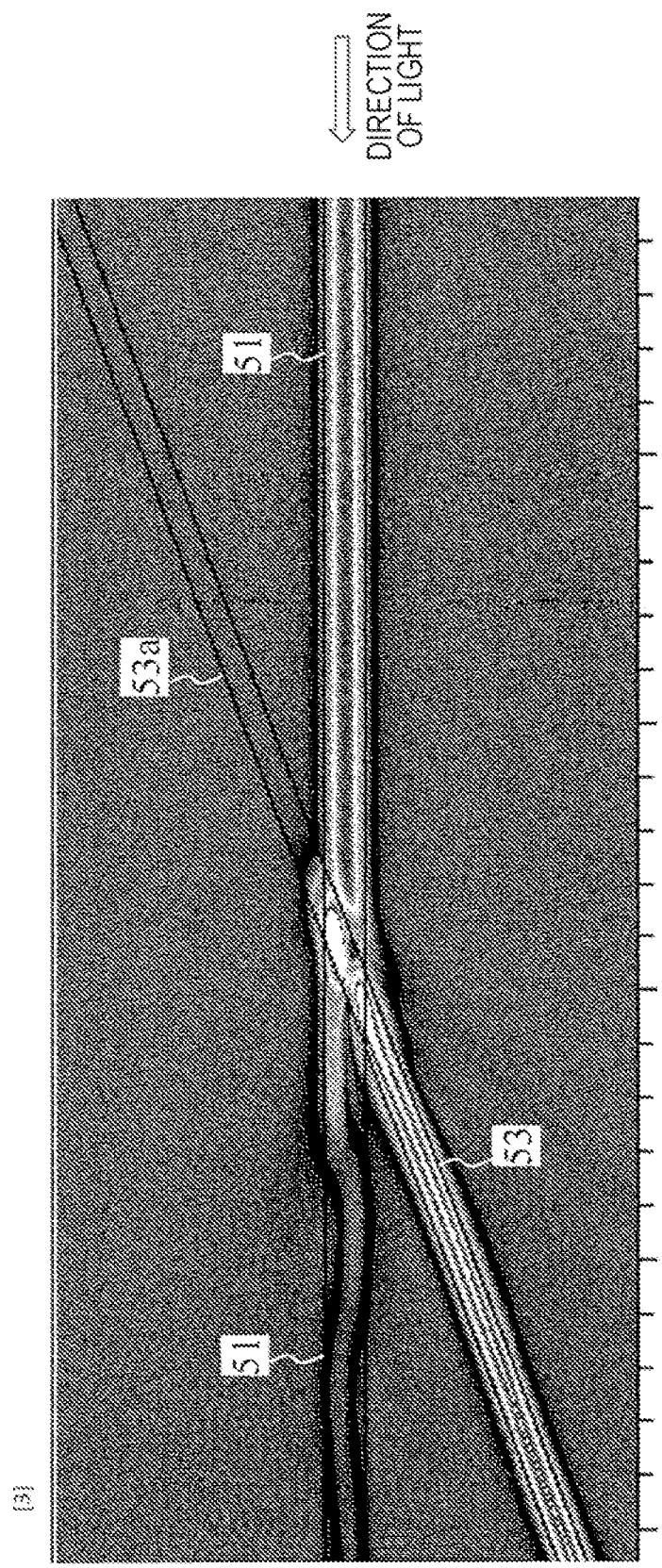
FIG. 3 is a diagram for explaining the characteristics of an optical side input/output circuit according to the present invention.

FIG. 3 is a diagram for explaining an example of an electrical field distribution in the tap portion 10 in a case where α=2.5°. Here, $\delta n_{core}=\delta n_{clad}=0.006$, and $d_t=6$ μm. Reflected light is supposed to propagate from right to left in the drawing. The wavelength of light is 1550 nm. In the tap portion 10, a state in which the light propagating in the core 51 is coupled to the tap waveguide 53 can be seen. However, the light is not coupled to a tap waveguide 53a extending in the opposite direction to the propagation direction. As can be seen from this drawing, the coupling to the tap waveguide 53 has great dependence (α dependence) on the orientation of the tap waveguide.

Figure 4:
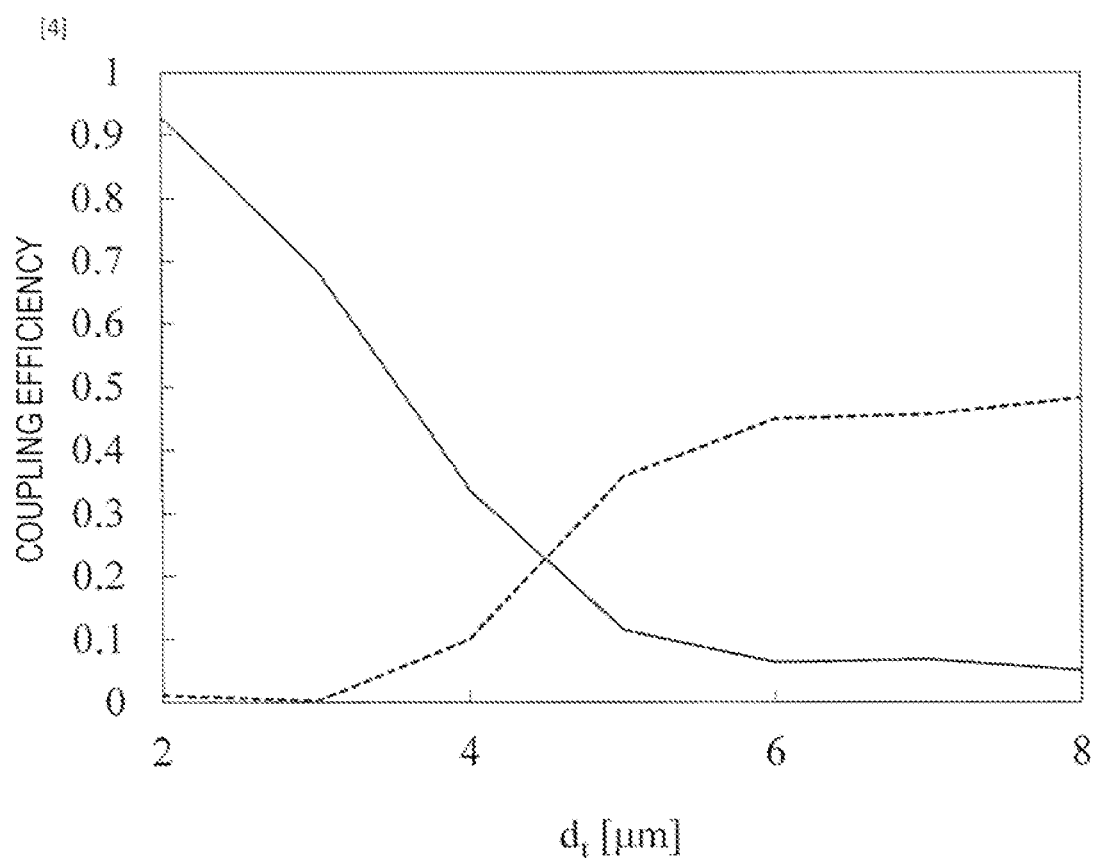
FIG. 4 is a graph for explaining the characteristics of an optical side input/output circuit according to the present invention.

FIG. 4 is a graph for explaining the $d_t$ dependence of the coupling efficiency at which light propagating in the opposite direction to the light propagation direction in the core 51 is coupled to the tap waveguide 53. A tap waveguide 53 in $\delta n_{core}=\delta n_{clad}=0.006$ is formed for a fiber structure having a step-index refractive index distribution where $d_c=8.2$ μm, $n_{core}=1.449081$, and $n_{clad}=1.444$. Here, α=3°. The solid line indicates the efficiency of coupling to the core 51 (the ratio of light that is from the grating portion 20 and is propagating in the core 51), and the dotted line indicates the efficiency of coupling to the tap waveguide 53 (the ratio of light that is from the grating portion 20 and is coupled to the tap waveguide 53). As can be seen from the graph, the efficiency of coupling to the tap waveguide 53 increases with the diameter $d_t$ of the tap waveguide 53.

Figure 5:
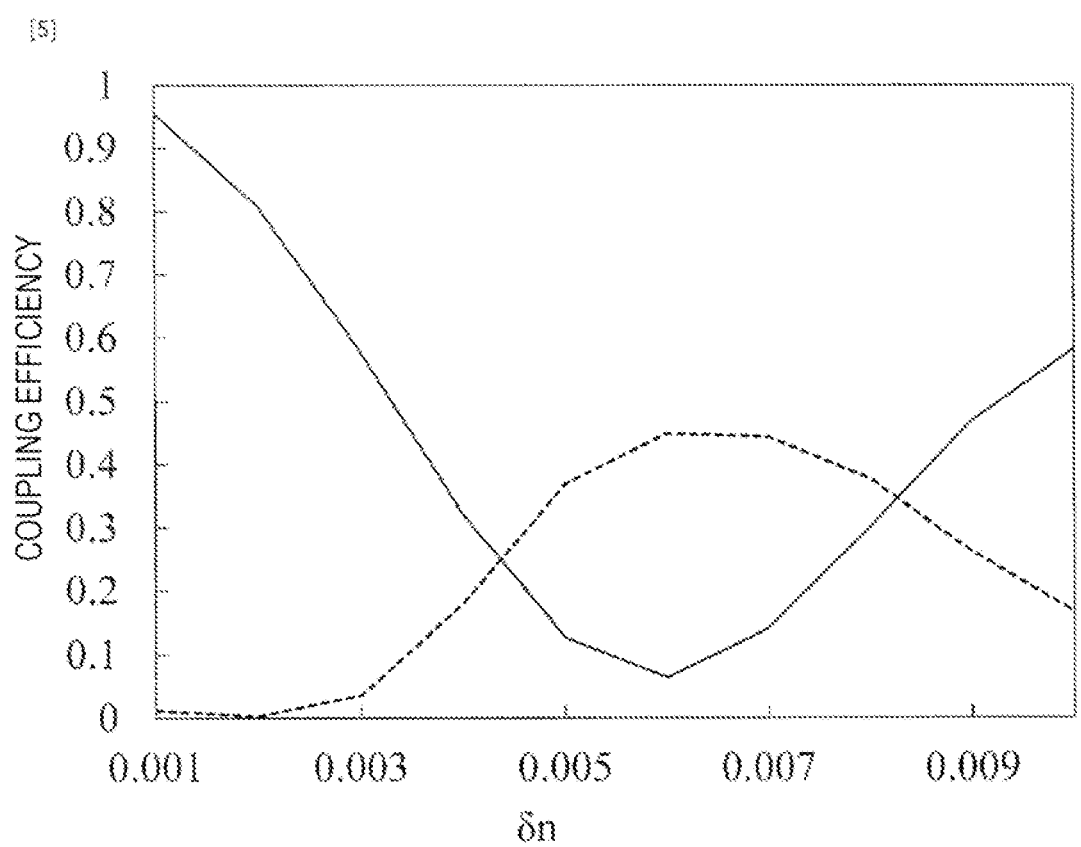
FIG. 5 is a graph for explaining the characteristics of an optical side input/output circuit according to the present invention.

FIG. 5 is a graph for explaining the δn dependence of the coupling efficiency at which light propagating in the opposite direction to the light propagation direction in the core 51 is coupled to the tap waveguide 53. A tap waveguide 53 in which $d_t=6$ μm is formed for a fiber structure having a step-index refractive index distribution where dc=8.2 μm, ncore=1.449081, and nclad=1.444. Here, α=3°. The solid line indicates the efficiency of coupling to the core 51 (the ratio of light that is from the grating portion 20 and is propagating in the core 51), and the dotted line indicates the efficiency of coupling to the tap waveguide 53 (the ratio of light that is from the grating portion 20 and is coupled to the tap waveguide 53). As can be seen from the graph, the efficiency of coupling to the tap waveguide 53 changes with the refractive index modulation amount δn, and the coupling efficiency is maximized when $δn_{core}=δn_{clad}=0.006$.

As can be seen from FIGS. 4 and 5, the efficiency of coupling to the tap waveguide depends on $d_t$ and δn, and it is possible to perform coupling about 50% from the core 51 to the tap waveguide 53 by appropriately setting $d_t$ and δn.

The grating portion 20 reflects only the wavelength to be extracted by the fiber Bragg grating (FBG) 21 from the light traveling in the light propagation direction in the core 51, and returns the reflected light to the tap portion 10. The grating pitch Λ is calculated according to the expression shown below, from the wavelength λ in vacuum and the average value $n_{eff}$ of the effective refractive indexes in the grating portion 20 at the wavelength λ (see Non Patent Literature 2, for example).

[Mathematical Expression 1]

$$\Lambda = \frac{\lambda}{2n_{eff}} \quad (1)$$

Figure 6:
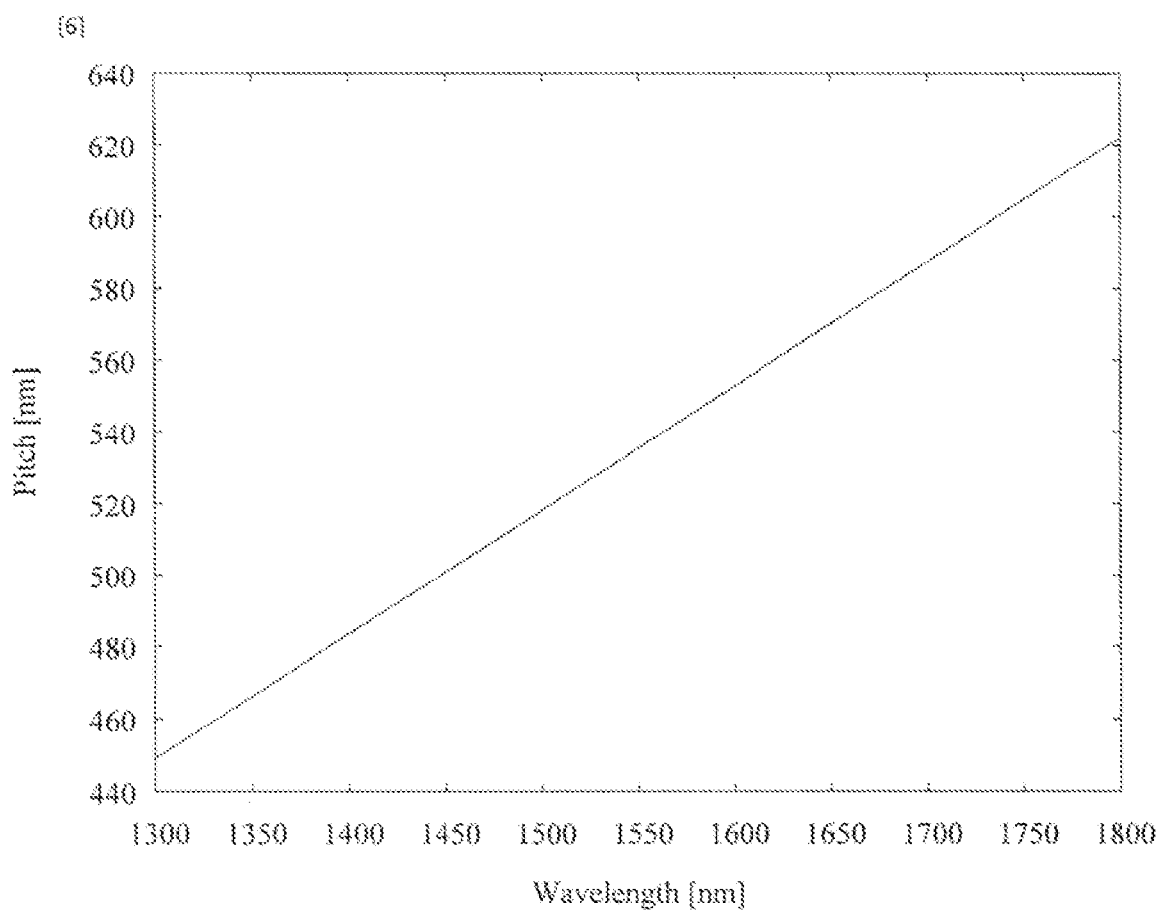
FIG. 6 is a graph for explaining the characteristics of an optical side input/output circuit according to the present invention.

FIG. 6 is a graph for explaining the wavelength dependence of the grating pitch of the grating portion 20. Note that this graph shows a calculation of a structure in which a grating having a refractive index modulation amount δn of 0.003 is provided for a fiber structure having a step-index refractive index distribution where $d_c=8.2$ μm, $n_{core}=1.449081$, and $n_{clad}=1.444$. For example, where a grating pitch Λ of 534 nm is set, the grating portion 20 can selectively reflect light having a wavelength of 1550 nm.

Figure 7:
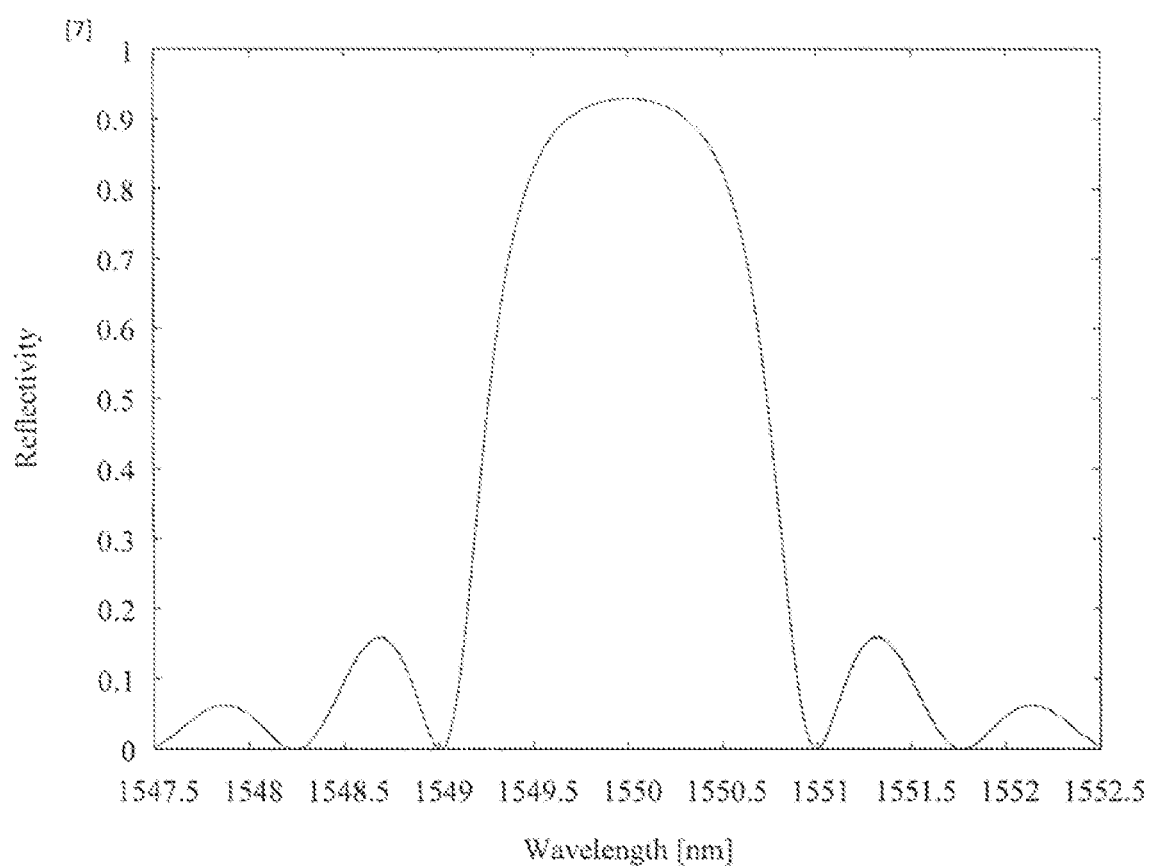
FIG. 7 is a graph for explaining the characteristics of an optical side input/output circuit according to the present invention.

FIG. 7 is a graph for explaining the wavelength dependence of the reflectivity of the grating portion 20. Note that this graph shows the calculation result in a case where the effective refractive index $n_{eff}=1.45$, the refractive index modulation amount=0.003, the grating length Lg=1 cm, and the grating pitch Λ=534 nm. Further, the reflectivity is shown as normalized output power of the backward transmission light at the end of entrance to the grating portion 20.

Figure 8:
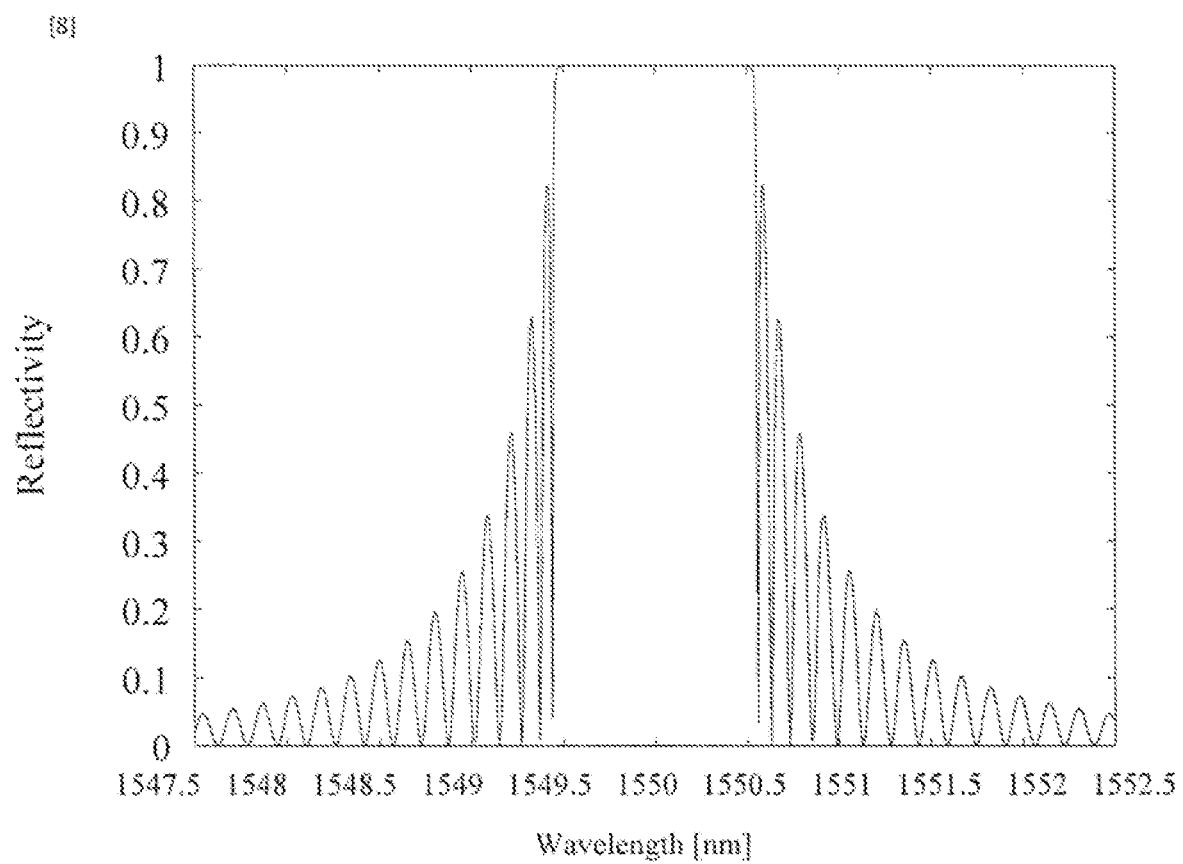
FIG. 8 is a graph for explaining the characteristics of an optical side input/output circuit according to the present invention.

Note that it is possible to adjust the passband width (the wavelength range of reflected light) by changing δn and the grating length Lg. FIG. 8 is a graph for explaining the wavelength dependence of the reflectivity of the grating portion 20 when the grating length Lg is 1.5 cm. As can be seen from the graph, the wavelength range of reflected light is narrower than the waveform of the grating length Lg=1 cm in FIG. 7.

Note that the FBG can be formed by a CO2 laser or a femtosecond laser.

Second Embodiment

Figure 9:
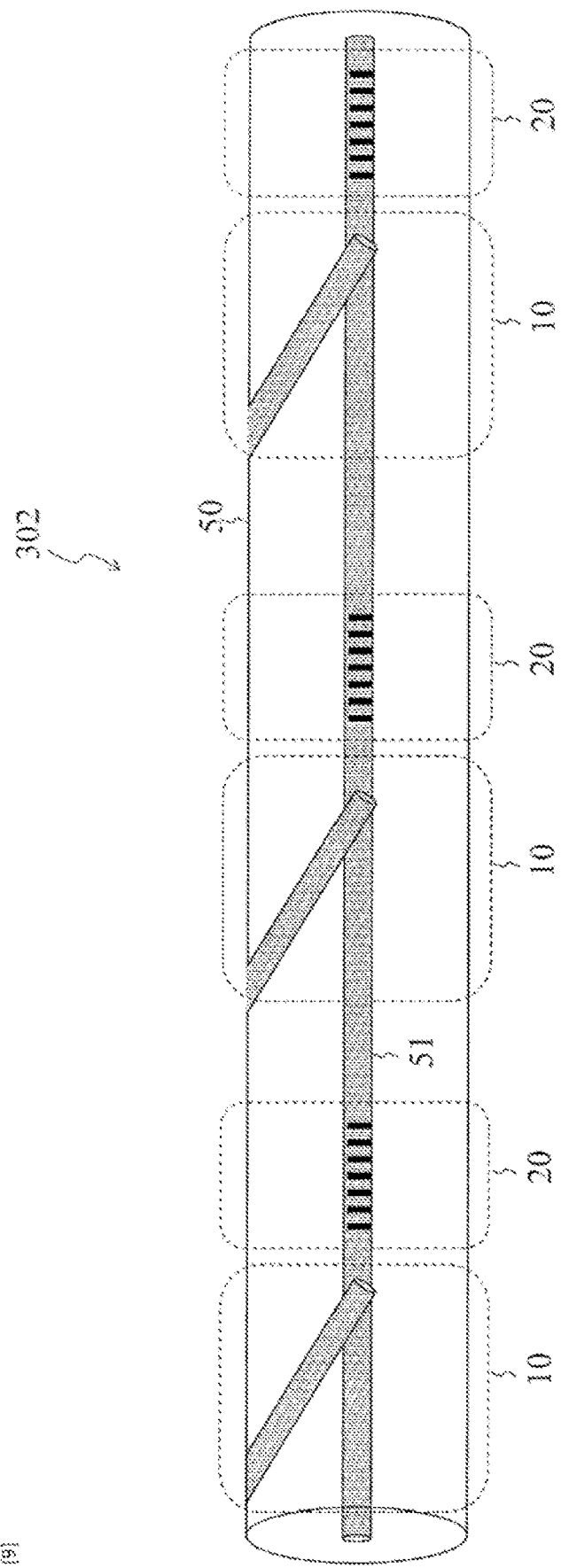
FIG. 9 is a diagram for explaining an optical side input/output circuit according to the present invention.

FIG. 9 is a diagram for explaining an optical side input/output circuit 302 according to this embodiment. The optical side input/output circuit 302 differs from the optical side input/output circuit 301 illustrated in FIG. 1 in that a plurality of sets of the tap portion 10 and the grating portion 20 is continuously arranged in the optical fiber 50.

Figure 10:
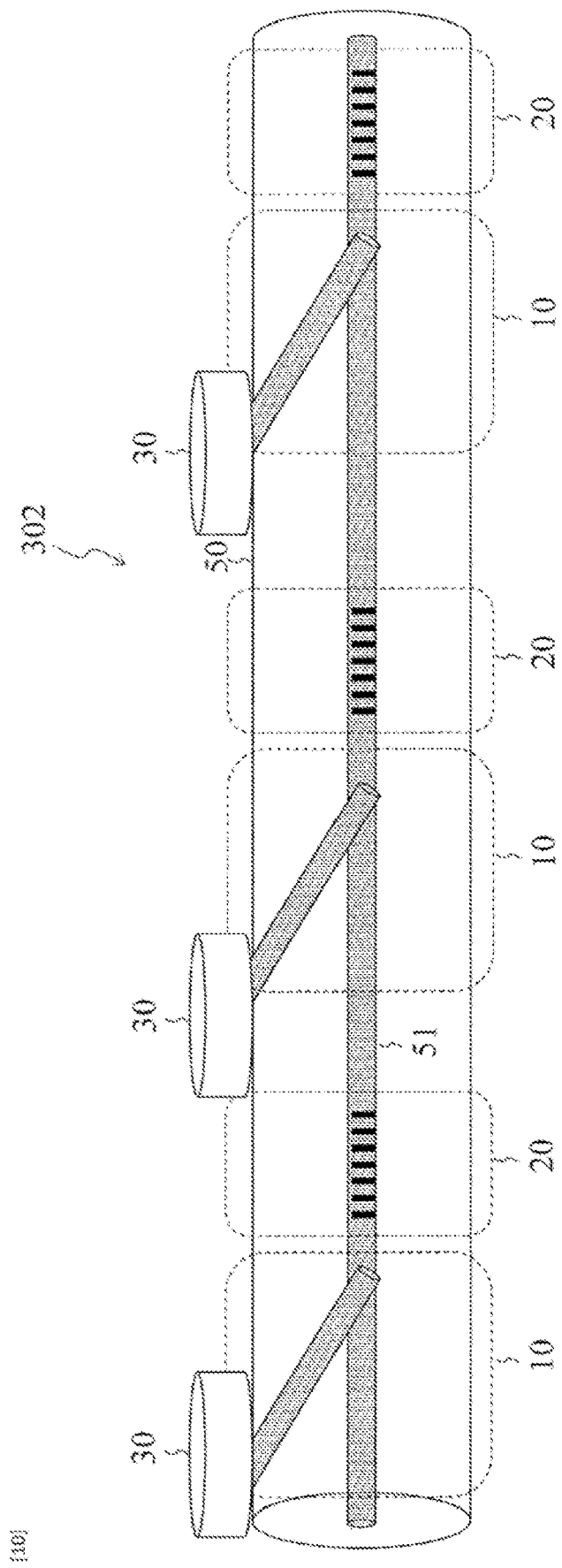
FIG. 10 is a diagram for explaining an optical side input/output circuit according to the present invention.

As the sets of the tap portion 10 and the grating portion 20 are arranged in the light propagation direction, the optical side input/output circuit 302 can perform tapping (which is taking out light of a desired wavelength from the optical fiber 50) at any position in the transmission path. Further, as illustrated in FIG. 10, the optical side input/output circuit 302 can form a multistage optical feed system by attaching optical feed elements 30 onto output portions on the side surface.

Figure 11:
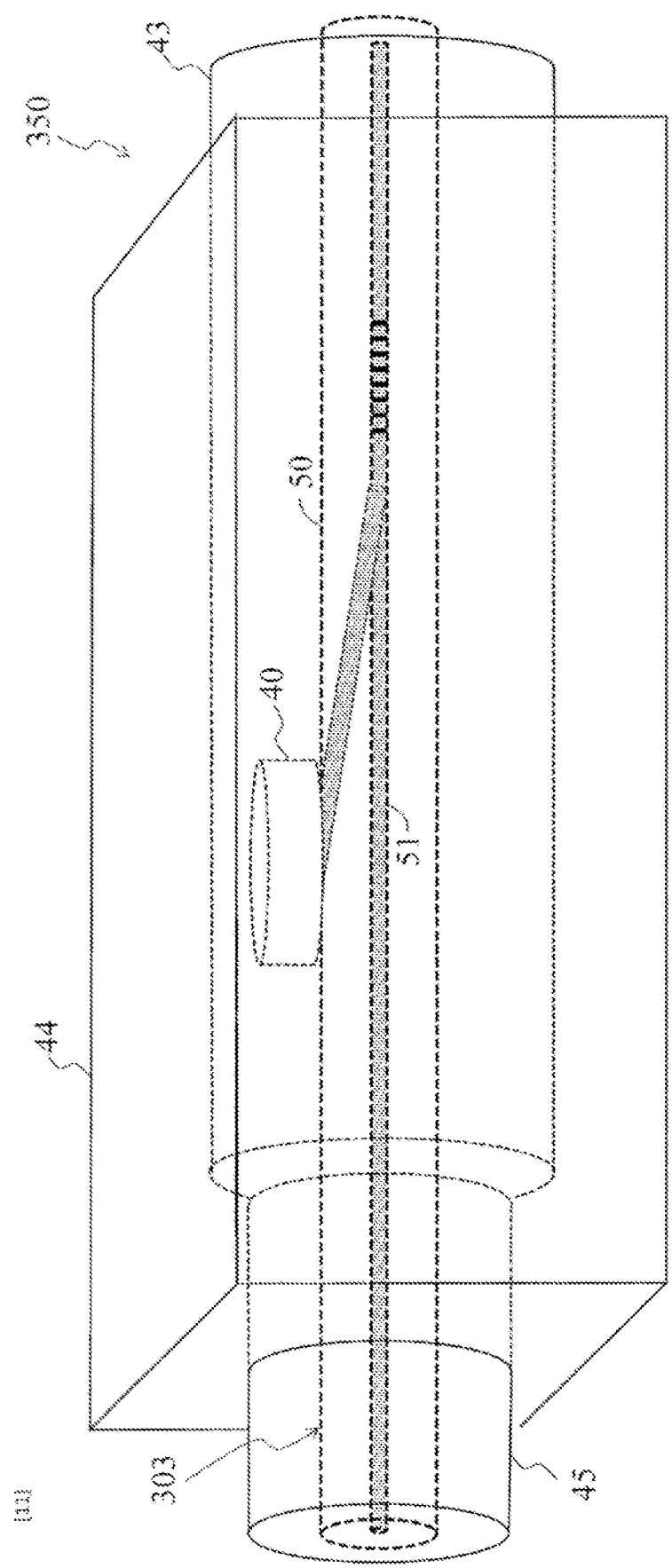
FIG. 11 is a diagram for explaining an optical connector according to the present invention.

FIGS. 11 and 12 are diagrams for explaining an optical connector 350 of this embodiment. The optical connector 350 includes an optical side input/output circuit 303. The optical side input/output circuit 303 is the same as the optical side input/output circuit 301 described with reference to FIG. 1, except for further including a light receiver 40 that is disposed on the side surface of the optical fiber 50 and receives the reflected light output from the tap portion 10. Reference numeral 45 indicates the coating of the optical fiber 50.

The optical connector 350 includes a ferrule 43 that has the optical side input/output circuit 303 therein, and a connector plug 44 that serves to connect to another optical connector. The shape of the connector plug 44 is of SC type, FC type, LC type, MPO type, or the like, which is widely used. By inserting the optical side input/output circuit 303 into the optical connector 350, it is possible to easily connect to another optical fiber 50a, and realize optical side inputs/outputs from the optical fiber 50.

EFFECTS

In the optical side input/output circuits and the optical connector described in the first to third embodiments, wavelength selectivity is added to the optical side input/output technology, so that light of a desired wavelength and desired power are extracted in a transmission path. For example, feed light is extracted in multiple stages, sensor control is performed, and the extracted light is input to another optical fiber. Thus, path control can be performed depending on wavelength.

REFERENCE SIGNS LIST 10 tap portion
20 grating portion
21 fiber Bragg grating (FBG)
30 optical feed element
40 light receiver
43 ferrule
44 connector plug
45 coating
50, 50a optical fiber
51 core
52 cladding
53 tap waveguide
301 to 303 optical side input/output circuit
350 optical connector

The invention claimed is:
1. An optical side input/output circuit comprising:
a grating portion in which a fiber Bragg grating that reflects light of a desired wavelength is formed in a core of a step-index optical fiber, the light of the desired wavelength being of light propagating in the core; and
a tap portion that is disposed at a stage before the grating portion in a propagation direction of the light, and is provided with a tap waveguide that outputs a reflected light reflected by the grating portion from a side surface of the optical fiber;
wherein the tap portion is configured such that the tap waveguide extends from outside the optical fiber, passes through a cladding of the optical fiber, and connects to the core, and wherein an angle formed between the core and the tap waveguide on a side opposite to the grating portion is an acute angle.

2. The optical side input/output circuit according to claim 1, wherein a plurality of sets of the tap portion and the grating portion is continuously arranged in the optical fiber.

3. The optical side input/output circuit according to claim 1, further comprising a light receiver that is disposed on the side surface of the optical fiber, and receives the reflected light output from the tap portion.

4. An optical connector comprising the optical side input/output circuit according to claim 1.

* * * * *